UNITED STATES PATENT OFFICE.

MAX FREMERY AND JOHANN URBAN, OF OBERBRUCH, GERMANY.

MANUFACTURE OF THREADS, &c., FROM CELLULOSE.

SPECIFICATION forming part of Letters Patent No. 691,257, dated January 14, 1902.

Application filed June 20, 1899. Serial No. 721,260. (No specimens.)

*To all whom it may concern:*

Be it known that we, MAX FREMERY, a subject of the German Emperor, and JOHANN URBAN, a subject of the Emperor of Austria-Hungary, both residing at Oberbruch, near Aachen, in the German Empire, have invented certain new and useful Improvements in the Manufacture of Threads, &c., from Cellulose; and we do hereby declare the following to be a full, clear, and exact description of the invention, such as will enable others skilled in the art to which it appertains to make and use the same.

In the manufacture of threads, strips, and other such products obtained from cellulose directly dissolved in cellulose solvents, and therefore consisting of cellulose or hydrocellulose or hydrate of cellulose or amyloid, the ordinary methods of drying leave the cellulose in a porcelain-like soft dull mass of little strength. This is not useful for many purposes—as, for instance, the production of artificial silk.

The object of our invention is to so dry the cellulose products as to give them at the same time great strength and a fine gloss. For this purpose instead of drying the cellulose products or bringing them at once to a temperature ranging from 80° to 100° centigrade we first subject these products to a temperature of not over 40° while the cellulose threads or the like are held under tension such that a contraction of the cellulose particles cannot take place. If desired, this drying may take place while the products are in a closed chamber under vacuum or while subjected to a strong current of air. By thus drying the cellulose products at this relatively low temperature and while under tension they are freed of their contained water and become firm and strong and have a glossy surface. Thereafter the usual further treatment—as, for instance, moistening, with subsequent drying at high temperatures—may be carried on without impairing the firmness or strength or gloss of the cellulose.

By way of example we may observe that in the production of artificial silk this mode of operation will be followed: After the cellulose precipitated from the solvent (ammoniacal solution of oxid of copper, chlorid of zinc, or the like) has been formed into threads of more or less gelatinous nature and wound onto spools or rollers the threads in this their natural tension are heated to a temperature not exceeding 40° centigrade, and, if desired, this may be in a vacuum or under the action of a strong current of air. They are afterward subjected to the ordinary higher drying temperatures. The cellulose threads thus formed are transparent and very glossy and strong.

In our invention it is important that the drying process be carried on at a comparatively low temperature, not exceeding about 40° centigrade. We do not broadly claim drying under heat or at an elevated temperature; but we claim drying at a special temperature—*i. e.*, at a temperature not exceeding about 40° centigrade. Furthermore, our invention does not relate to a process of drying any "cellulose" products, so as to embrace also the drying of cotton or of nitrocellulose products; but it relates only to drying cellulose products which have been obtained from a solution of cellulose in a solvent of cellulose. Such cellulose products are only intended to be treated and contain commonly hydrocellulose or particular hydrates of cellulose. Such cellulose products cannot be dried like ordinary cellulose products—*e. g.*, cotton—at any elevated temperature up to about 100° centigrade in a dry atmosphere, because they would become brownish and be destroyed. They must be dried, as we have found, at a temperature not exceeding about 40° centigrade. Furthermore, we do not broadly claim the drying of any cellulose products, so *e. g.*, of cotton, while under tension; but we claim the drying of cellulose products obtained from cellulose directly dissolved in cellulose solvents (which cellulose products contain hydrocellulose or particular hydrates of cellulose) at a temperature not exceeding about 40° centigrade and being held under tension by being wound onto spools or rollers, so as to act everywhere uniformly in opposition to the natural contraction of these artificial cellulose products by reason of the fact that the threads or the like wound on the spools or rollers are for their whole length in close contact with the surface of the spools or with a layer of threads or the like closely surrounding the spools.

We claim as our invention—

As an improvement in the manufacture of threads obtained from dissolved cellulose, the herein-described process consisting in first obtaining threads, strips or other such products from the cellulose solutions, then winding up these cellulose products, while freshly produced, and then directly subjecting these cellulose products while wound up to the action of a low heat not exceeding about 40° centigrade, whereby the threads wound on spools or rollers are held in their natural tension, substantially as described.

In testimony whereof we affix our signatures in presence of two witnesses.

M. FREMERY.
JOH. URBAN.

Witnesses:
E. M. BRUNDAGE,
C. E. BRUNDAGE.